Nov. 4, 1941.  W. SAMANS  2,261,293
HEAT EXCHANGE APPARATUS
Filed July 16, 1938   6 Sheets-Sheet 1
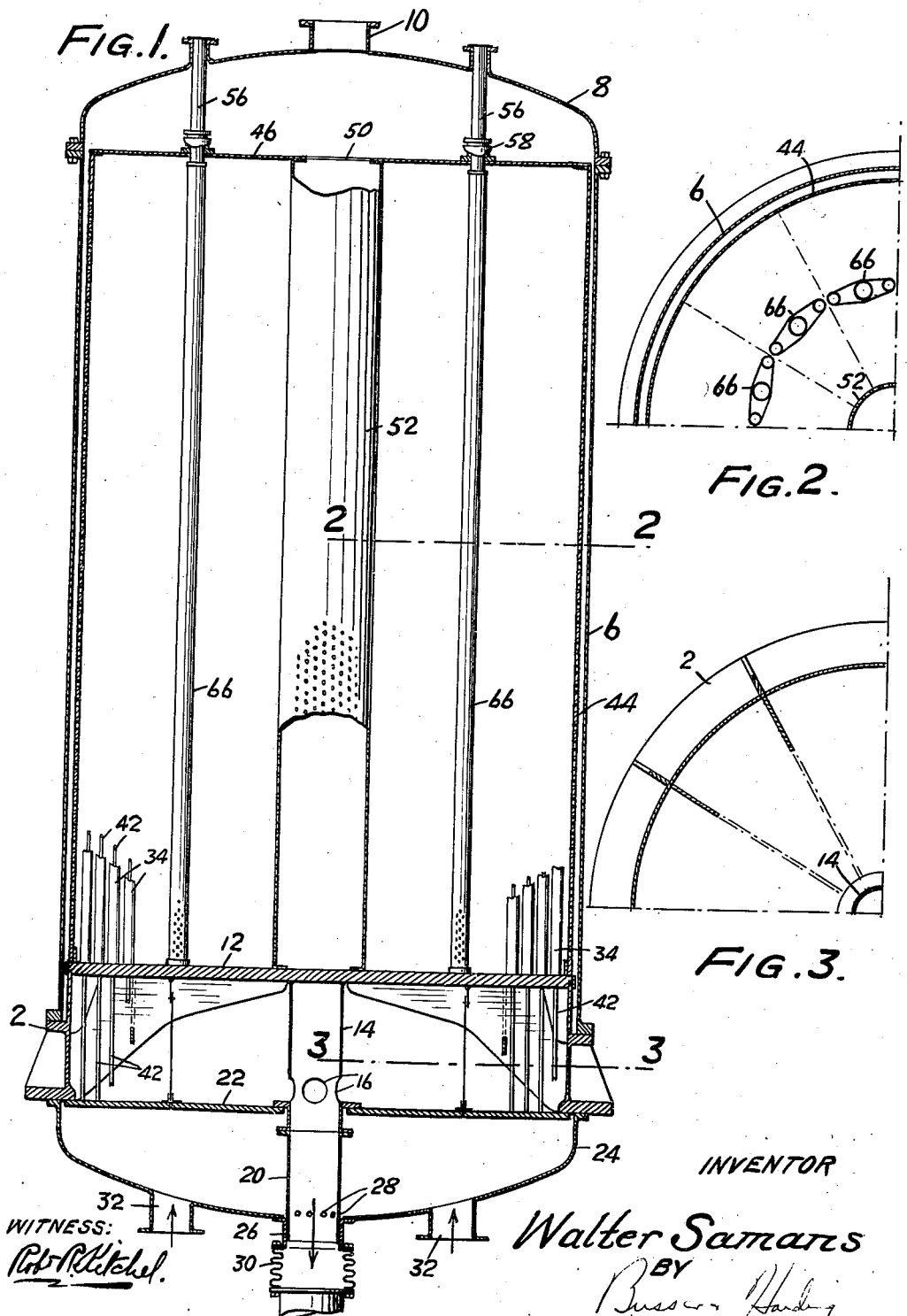
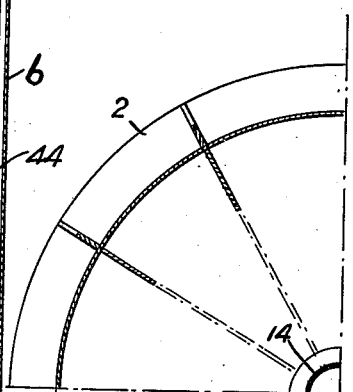
INVENTOR
Walter Samans
BY
ATTORNEYS.
WITNESS:

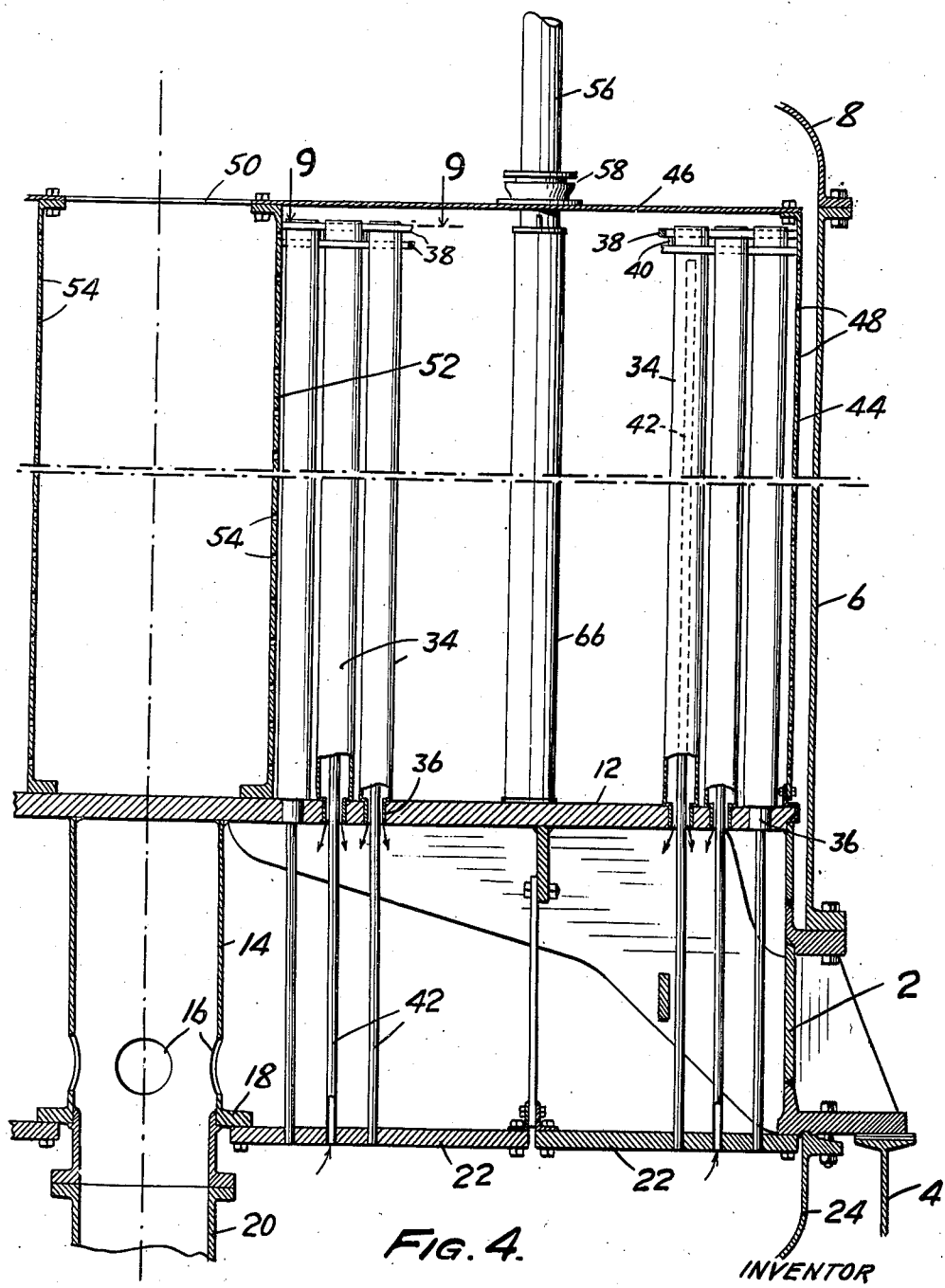

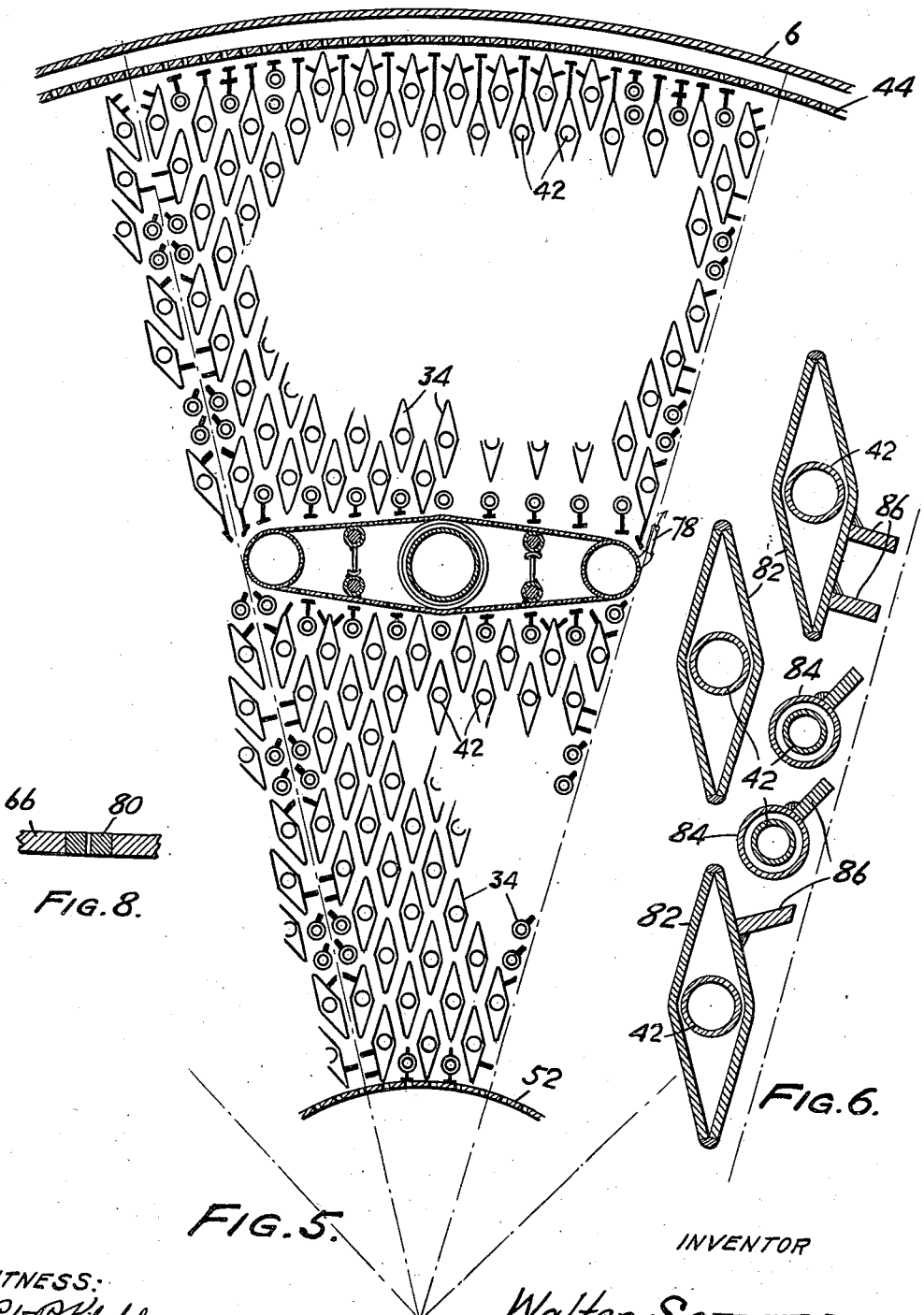

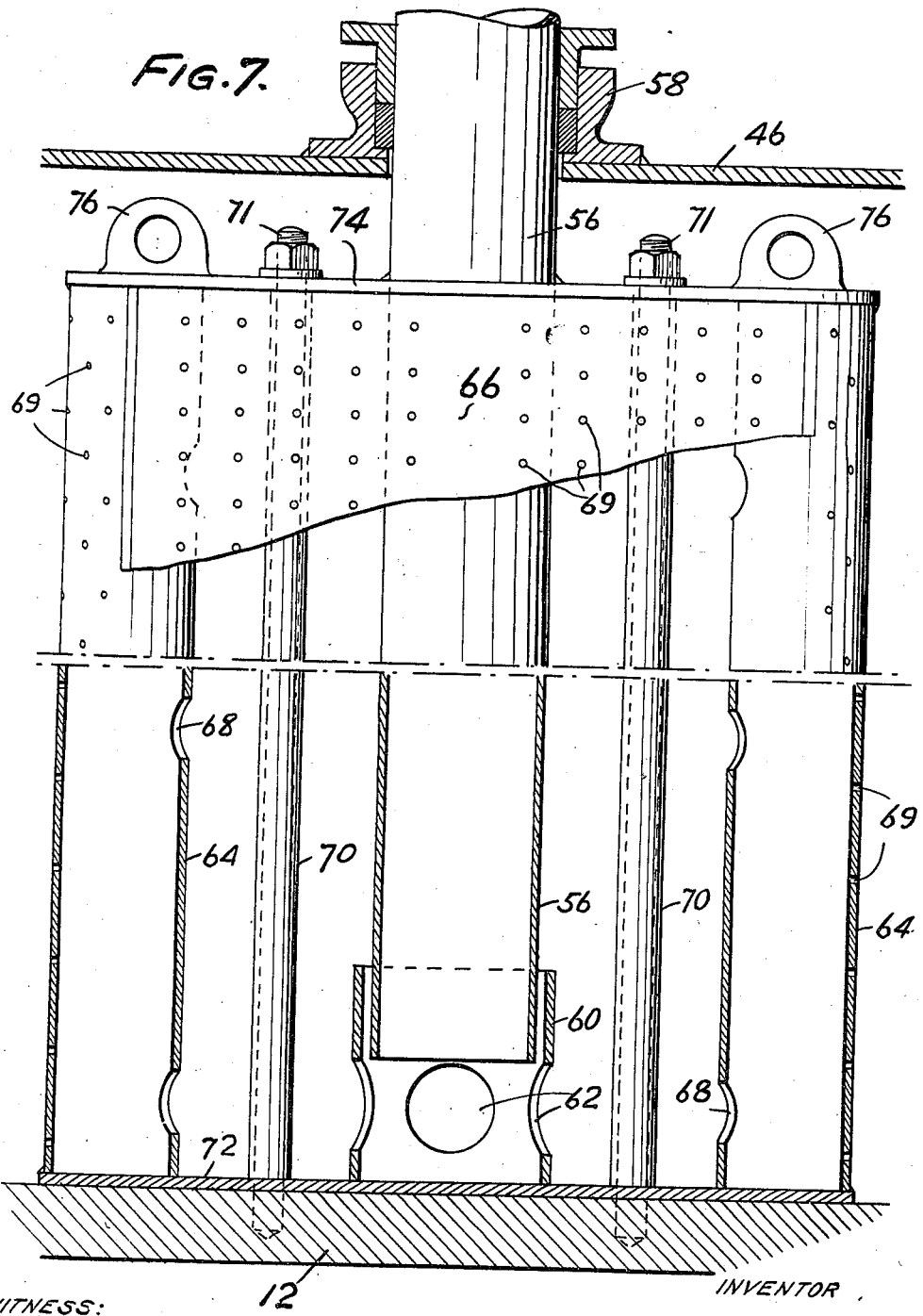

Nov. 4, 1941. W. SAMANS 2,261,293
HEAT EXCHANGE APPARATUS
Filed July 16, 1938 6 Sheets-Sheet 5

WITNESS:
INVENTOR
Walter Samans
BY
ATTORNEYS.

Nov. 4, 1941.  W. SAMANS  2,261,293
HEAT EXCHANGE APPARATUS
Filed July 16, 1938  6 Sheets-Sheet 6
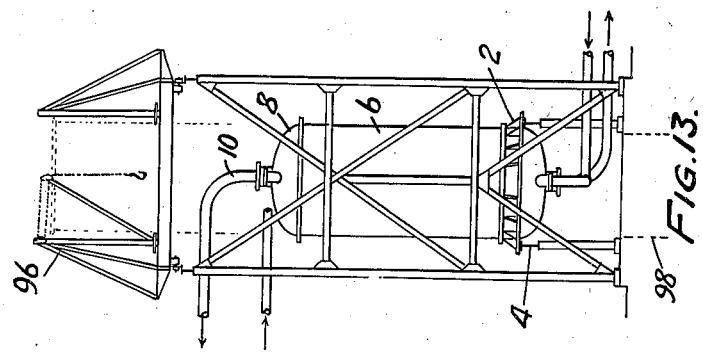
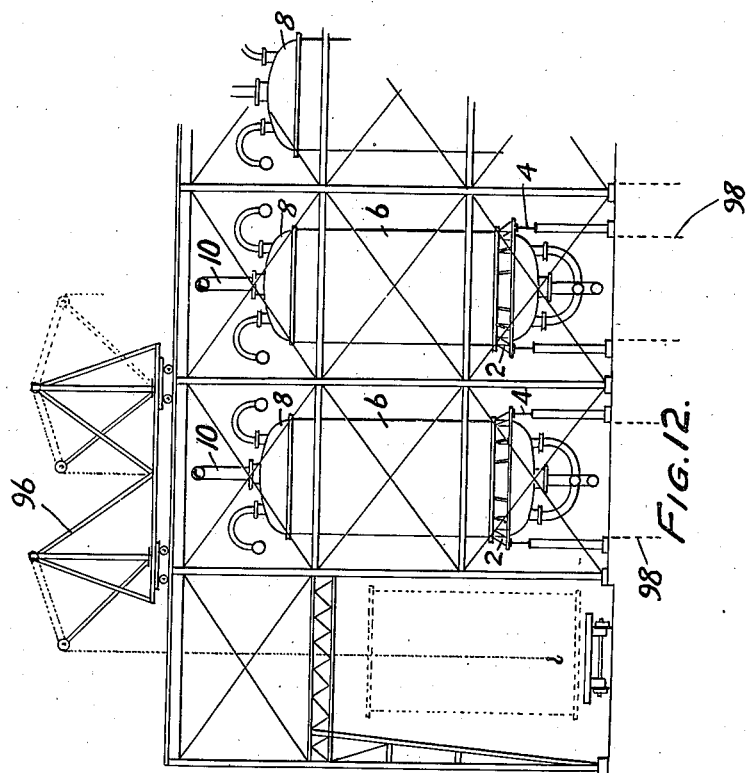
WITNESS:
INVENTOR
Walter Samans
BY
ATTORNEYS Patented Nov. 4, 1941

2,261,293

UNITED STATES PATENT OFFICE 2,261,293

HEAT EXCHANGE APPARATUS

Walter Samans, Philadelphia, Pa., assignor, by mesne assignments, to Houdry Process Corporation, Wilmington, Del., a corporation of Delaware Application July 16, 1938, Serial No. 219,568

5 Claims. (Cl. 23—288)

This invention relates to heat exchange apparatus, and specifically to an apparatus designed for heat exchange between one fluid and a fluid passing in contact with a solid material such as a catalyst.

In the catalytic treatment of various materials, it is frequently necessary to provide heat exchange either to heat the region in which a reaction is taking place or to cool that region in case the reaction is accompanied by the liberation of substantial amounts of heat. If the reacting region is to be uniformly heated or cooled, the heat exchange medium must be introduced quite uniformly into all parts of such region. If the region involves the presence of a catalyst, this generally means that the catalyst is located within relatively small zones formed by the carriers for the heat exchange medium. Since such reactions, particularly when catalyst is employed, involve the necessity for cleaning and/or renewal of catalyst, much time may be spent in effecting the dismantling of the apparatus and recharging.

It is the general object of the present invention to provide a heat exchange apparatus which is adapted not only for proper uniform heat exchange, but also for relatively simple dismantling, cleaning and recharging.

The general object of the invention, as well as specific objects, particularly relating to details of construction, will be apparent from the following description read in conjunction with the accompanying drawings, in which:

Figure 1 is a vertical section through the improved heat exchanger, certain parts being omitted for clarity;

Figure 2 is a horizontal section taken on the plane indicated at 2—2 in Figure 1;

Figure 3 is a horizontal section taken on the plane indicated at 3—3 in Figure 1;

Figure 4 is a fragmentary section similar to that illustrated in Figure 1, but showing more details;

Figure 5 is a segmental horizontal section taken on the same plane as Figure 2, but showing the detailed arrangements of the heat exchange elements and the distributing means;

Figure 6 is an enlarged horizontal section showing details of the heat exchange elements;

Figure 7 is a fragmentary vertical section showing various parts broken and illustrating on enlarged scale a distributing device;

Figure 8 is an enlarged sectional view showing the specific form of an orifice of a distributing device;

Figure 12 is a front elevation of a portion of a battery of heat exchangers illustrating a crane arrangement used in dismantling them; and Figure 13 is a side elevation of the same.

Figures 9, 10, 11:
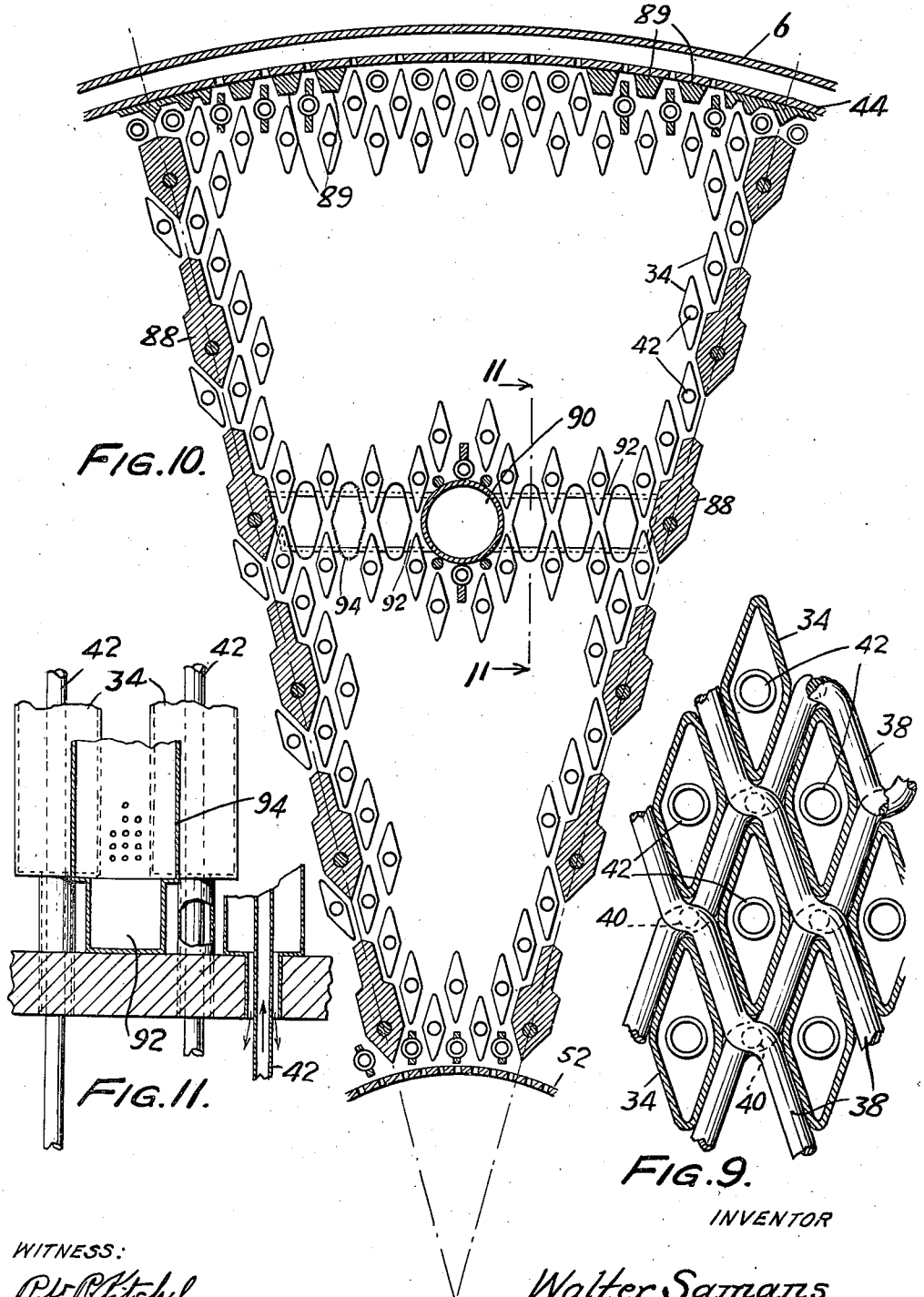
Figure 9 is a section taken on the plane indicated at 9—9 in Figure 4, showing a grating arrangement for holding the heat exchange elements in spaced position.
Figure 10 is a horizontal sectional view similar to Figure 5 but showing an alternative arrangement of heat exchange elements and associated devices.
Figure 11 is a vertical section taken on the plane indicated at 11—11 of Figure 10.

Each of the heat exchangers comprises an annular supporting structure indicated at 2, arranged to rest upon suitable beams indicated at 4, arranged to provide a support raising the bottom of the heat exchange apparatus off the level of the ground. Bolted to the top of the supporting structure 2 is an outer shell 6 surmounted by the cap 8 bolted to it and provided with a central outlet 10 for the fluid passing through the treating zone of the apparatus. Also secured to an upwardly extending flange of the supporting structure 2 is a tube sheet 12 to the bottom of which is welded at the imperforate central portion thereof a downwardly extending discharge tube 14 provided with entrance openings 16 and having a downward extension 20 joined to a lower cover member 24 bolted to the supporting structure 2. The extension 20 is secured to the cover member 24 by means of a flange device 26 and is joined to a discharge line through the medium of an expansible joint 30. A plurality of drain holes 28 serve to permit material to drain from the lowermost central portion of the cover member 24 into the extension 20, for complete drainage when this is required.

Flanges 18 join the tube 14 with segmental plates 22, which are in turn joined to similar plates through the medium of angle members supported by bars from the tube sheet 12. All of the various parts just mentioned are bolted together with suitable interposed packing so that they may be dismantled for cleaning purposes. The cover member 24 is provided with inlet passages 32 through which heat exchange medium may be introduced.

The tube sheet 12 has apertures therein receiving the reduced lower ends 36 of the outer tubular members 34 of the heat exchange elements. As will be pointed out hereafter, the portions of these tubular members above the sheet 12 are either circular or diamond shaped depending upon their positions. The upper ends of the tubular members 34 are held in proper spaced relationship by means of a grating arrangement illustrated in enlarged detail in Figure 9 and comprising upper and lower heavy rod elements 38 vertically spaced by means of upright rods 40 welded between them. The spaces left by this grating arrangement are, in general, diamond shaped and arranged to receive the upper ends of the tubular members 34. The grating permits catalyst to be filled into the case through it and top openings (not shown) to fill the spaces between the tubes.

Extending upwardly within the members 34 to substantially their upper closed ends are tubes 42 supported in apertures in the plates 22, which form tube sheets therefor. By reason of this arrangement the heat exchange medium, which in the present case is intended to be a liquid, is caused to enter the cover member 24, through the openings 32, thence pass upwardly through the tubes 42 into the upper closed ends of the tubular members 34, flowing downwardly within these tubular members 34 about the tubes 42 and discharging into the closed chamber provided between the plates 22 and the tube sheet 12. Thence discharge takes place through the openings 16 and the tube extension 20 into the discharge piping. Some bypassing flow of small and negligible quantity may continuously occur through the drain openings 28, which openings are provided for the purpose of completely draining the apparatus of the heat exchange liquid before dismantling takes place.

Surmounting the tube sheet 12 and bolted thereto is a shell 44 provided with a removable top 46 having a central aperture 50. Located below the top 46 and surrounding the aperture 50 is a cylindrical tube 52. The cylindrical outer wall of the shell 44 is perforated as indicated at 48, the same being true as indicated at 54 in the case of the tube 52. The annular space between the tube 52 and the outer wall 44 of the shell is the reaction zone into which the tubular members 34 extend. From this reaction zone the reacting materials may flow through the openings 48 and 54 into the clearance space between the wall 44, and into wall 6 and the tube 52, respectively, and thence into the cover 8 to be discharged through the outlet 10.

Extending through the cover 8 are a series of inflow tubes 56 suitably packed in the cover and also packed through the top 46 of the inner shell, as indicated at 58. The tubes 56 extend substantially to the tube sheet 12 in the vicinity of an imperforate portion thereof, projecting downwardly inside thimbles 60 perforated as indicated at 62 for the outward passage of the inflowing fluid into distributing devices of which one is illustrated in detail in Figure 7. Each distributing device comprises a pair of upright tubes 64 joined by sheets 66 welded to them and communicating with the region between the sheets 66 and with the space surrounding the tube 56 through large openings 68. The sheets 66 and the tubes 64 are provided with perforations indicated generally at 69, comprising, in detail, perforated buttons 80 inserted into the metal, and formed of corrosion resisting alloy steel to avoid the destruction which would occur if the aperture 69 were merely formed in the material of the sheets 66 and tubes 64. The structure so far described is provided with upper and lower cover plates 74 and 72 joined by tubes 70 through which extend bolts 71 serving to secure the distributing structures to the tube sheet 12. All of the various parts are preferably welded together as indicated in Figure 7. The structures are provided with eyes 76 for the reception of hooks whereby the structures may be raised as units out of the apparatus.

The lower end of each distributing arrangement is provided with a drain pipe indicated at 78 in Figure 5, for the purpose of carrying off any materials (such as tar in the treatment of petroleum hydrocarbons) which may tend to accumulate.

As indicated heretofore, the tubular members which have been generally designated as 34 are shown as taking two distinct forms in the detailed view of Figure 6, as illustrated at 82 and 84. The former is of diamond shape and the latter of cylindrical shape. Either or both of these forms may be provided with laterally extending fins 86 welded to them for the purpose of heat exchange in regions relatively remote from their walls.

In the operation of this type of apparatus, the spaces between the tubes 34 located in the annular space between the cylindrical shell 44 and the tube 52 are filled with catalyst or some material with which fluid, specifically in gaseous or vapor form, is to contact. The gas or vapor is introduced through the tubes 56 and distributed through the openings 69 in the structure illustrated in Figure 7. The gas or vapor is caused to flow to the bottom of the distributing structure, whereupon reversal takes place to reach the openings in the upper portions thereof. Thereby more uniform heating and distribution is effected than would result if the fluid entered the shell structure at the top thereof. Thence the gas or vapor passes substantially uniformly through the space between the tubes 34 to be discharged through the openings 48 and 54 and thence through the outlet 10. The particular shapes of the tubes 34 are provided in order that no portion of the catalyst or solid material contained between the tubes shall be more than some fixed small distance away from any tube 34 or, in any event, from a fin 86 connected to a tube 34 and having substantially the same temperature as the tube. In this way, local overheating, if the tubes contain a cooling medium, or local subcooling if the tubes contain a heating medium is avoided. By the arrangement of the diamond shaped tubes and fins if necessary in segmental groups as illustrated in Figure 5, it is possible to achieve this uniformity of the region between the tubes throughout the entire reacting zone.

The present invention, however, is not concerned with the shapes or arrangements of the tubes 34, but is particularly directed to the arrangement whereby such uniform heating or cooling as is indicated may be attained in a fashion consistent with ready dismantling of the apparatus for cleaning purposes and removal of the fluid between the tubes. As illustrated specifically in Figures 12 and 13, a battery of heat exchangers of the type described are desirably surmounted by a travelling crane arrangement indicated at 96, while below the exchangers are provided pits 98 into which the lower portions thereof may be lowered. By removing the bolts connecting the cover member 24 to the supporting structure 2 and by disconnecting the outlet pipes from the cover, the cover may be removed, exposing the tube sheets 22. These in turn may be freed from their supporting elements and dropped downwardly carrying with them the tubes 42 until the latter are clear of the supporting structure. The pits 98 provide sufficient downward clearance for the removal of the tubes. Thus the tubes may be cleaned or replaced if necessary. Alternatively the tubes may be made up in sections coupled together so as to be disconnected when required.

The upper part of the apparatus is equally readily made accessible. The cover 8, freed from the tubes 56 and outlet piping, may be lifted off, the outer shell 6 may be removed and then the cover plate 46 may be removed and the shell 44. The catalyst or other material between the tubes 34 may then be readily removed from the side of the apparatus. It will be obvious that refilling and reassembly may be accomplished in reverse order.

In Figures 10 and 11 there is shown an alternative arrangement generally the same as that heretofore described, except for a somewhat different arrangement of the distributing devices and the use of dummy filler elements between the adjacent groups of tubes 34. The dummy elements are indicated at 88 and are formed of solid metal secured in position by rods passing into a lower tube sheet. When such dummies are used, since they are not heated or cooled by any heat exchange medium, it is desirable to have a comparatively close spacing between them and the adjacent tubes 34 so as to adhere to the rule of insuring that no portion of the catalyst or other material is more than a certain distance away from the tubes 34. This arrangement will be obvious from Figure 10. It will be noted that the use of dummies of proper form makes it possible to eliminate substantially all of the circular tubes 34 and also to minimize the necessity of providing welded fins. It will be noted that dummy spacers 89 may also be used adjacent the outer wall of the shell.

The distributing arrangement is also somewhat different. In this case a central tube 90 which receives the reacting vapor or gas is provided with a lateral extension 92 from which there extend upwardly generally diamond shaped distributing tubes 94 interfitting with the adjacent tubes 34 as indicated in Figure 10. The tubes 94 are provided with discharge openings preferably fitted with corrosion resisting perforated buttons as indicated in Figure 8.

While the members illustrated in Figures 7 and 11 have been referred to as providing for entrance of the fluid being treated, it will be obvious that the direction of flow may be reversed if desired, the fluid entering from the outside and being collected by the devices of these figures.

It will be clear that various alternative arrangements may be adopted without departing from the invention as defined by the following claims.

What I claim and desire to protect by Letters Patent is

1. Apparatus comprising a shell structure, removable perforated inner and outer members defining an annular chamber inside said shell structure, a plurality of heat exchange tubes extending into said annular chamber, and removable upright fluid distributing devices projecting through said shell structure into said annular space in the midst of said group of tubes.

2. Apparatus comprising a shell structure including a reacting chamber and fluid distributing devices projecting into said reacting chamber, each of said fluid distributing devices comprising an outer elongated perforated shell, said perforated shell comprising a pair of parallel tubes joined by perforated side sheets and means for closing the upper and lower ends thereof.

3. Apparatus comprising a shell structure including removable upper and lower cover members, a tube sheet removably secured to said shell structure inside the lower cover member, tubes secured in said tube sheet at their lower ends and free at their upper ends whereby said tube sheet and tubes may be moved downwardly as a unit out of said shell structure upon removal of the lower cover member, a second tube sheet located above the first tube sheet, a second group of tubes closed at their upper ends and secured at their lower ends in said second tube sheet and arranged to receive the first mentioned tubes, removable inner and outer members defining an annular chamber including the last mentioned tubes, said inner member being perforated and removable upright fluid distributing devices projecting through the upper cover member into said annular space in the midst of said second group of tubes.

4. Apparatus comprising a shell structure including removable upper and lower cover members, a tube sheet removably secured to said shell structure inside the lower cover member, tubes secured in said tube sheet at their lower ends and free at their upper ends, a second tube sheet located above the first tube sheet, a second group of tubes closed at their upper ends and secured at their lower ends in said second tube sheet and arranged to receive the first mentioned tubes, removable perforated inner and outer members defining an annular chamber including the last mentioned tubes, and upright perforated fluid distributing devices projecting into said annular space in the midst of said second group of tubes.

5. Apparatus comprising a shell structure including removable upper and lower cover members, a tube sheet removably secured to said shell structure inside the lower cover member, tubes secured in said tube sheet at their lower ends and free at their upper ends, a second tube sheet located above the first tube sheet, a second group of tubes closed at their upper ends and secured at their lower ends in said second tube sheet and arranged to receive the first mentioned tubes, removable perforated inner and outer members defining an annular chamber including the last mentioned tubes, and upright perforated fluid distributing devices projecting into said annular space in the midst of said second group of tubes, and perforations in said inner and outer members, respectively, communicating with outer and inner spaces communicating with a common space within the upper cover member.

WALTER SAMANS.